United States Patent [19]

Hanson

[11] 4,298,296
[45] Nov. 3, 1981

[54] FORM HANDLING SYSTEM

[76] Inventor: Raymond A. Hanson, P.O. Box 7400, Spokane, Wash. 99207

[21] Appl. No.: 81,661

[22] Filed: Oct. 4, 1979

[51] Int. Cl.³ .......................... E02D 29/10; E03F 3/06
[52] U.S. Cl. .................................... 405/146; 405/150; 405/155; 134/166 R; 425/59
[58] Field of Search .................. 405/146, 134–149, 405/155, 150; 134/200, 166 C, 170, 122, 199; 425/59, 63, 64; 264/33

[56] References Cited

U.S. PATENT DOCUMENTS

| | | | |
|---|---|---|---|
| Re. 26,132 | 1/1967 | Cerutti | 405/138 |
| 59,578 | 11/1866 | Follensbee | |
| 515,016 | 2/1894 | Ransome | 264/33 |
| 1,751,147 | 3/1930 | Hackley | 405/146 X |
| 1,788,200 | 1/1931 | Molin et al. | |
| 1,792,084 | 2/1931 | Glasser | 405/148 |
| 2,870,518 | 1/1959 | Bossner | |
| 3,022,562 | 2/1962 | Card | |
| 3,123,883 | 3/1964 | Peirsol et al. | |
| 3,205,550 | 9/1965 | Martin | 425/59 |
| 3,206,824 | 9/1965 | Cerutti | 425/59 |
| 3,382,002 | 5/1968 | Tabor | 405/143 X |
| 3,561,223 | 2/1971 | Tabor | 405/147 X |
| 3,633,593 | 1/1972 | Slaats | 134/199 X |
| 3,768,267 | 10/1973 | Chlumecky | |
| 3,877,855 | 4/1975 | Hanson | 425/59 |

FOREIGN PATENT DOCUMENTS

1163356  9/1958  France ............................ 405/146

*Primary Examiner*—Dennis L. Taylor
*Attorney, Agent, or Firm*—Wells, St. John & Roberts

[57] ABSTRACT

A system is described whereby a large elongated monolithic conduit is formed within an excavation of a single continuous pour of concrete. The open core of the conduit is formed by an interconnected group of tubular form members, forming a static line within the excavation. The system includes a slipform mechanism that is progressively moved along the static line, molding wet concrete about the inner form sections. Successive inner form sections are disconnected from the rearward end of the static line (after the adjacent formed concrete has hardened), reduced in cross-sectional dimension, and transported forwardly through the static line to a forward conduit end. There the individual sections are expanded, cleaned and reattached to the front of the line as the slipform moves along. The successive inner form sections are disconnected, moved forwardly and re-expanded by a self-steering wheel supported transporter. The transporter is powered to move longitudinally within the static line. A trimmer is also provided at a forward end of the slipform to prepare a final grade within the excavation just prior to molding of the wet concrete.

24 Claims, 10 Drawing Figures

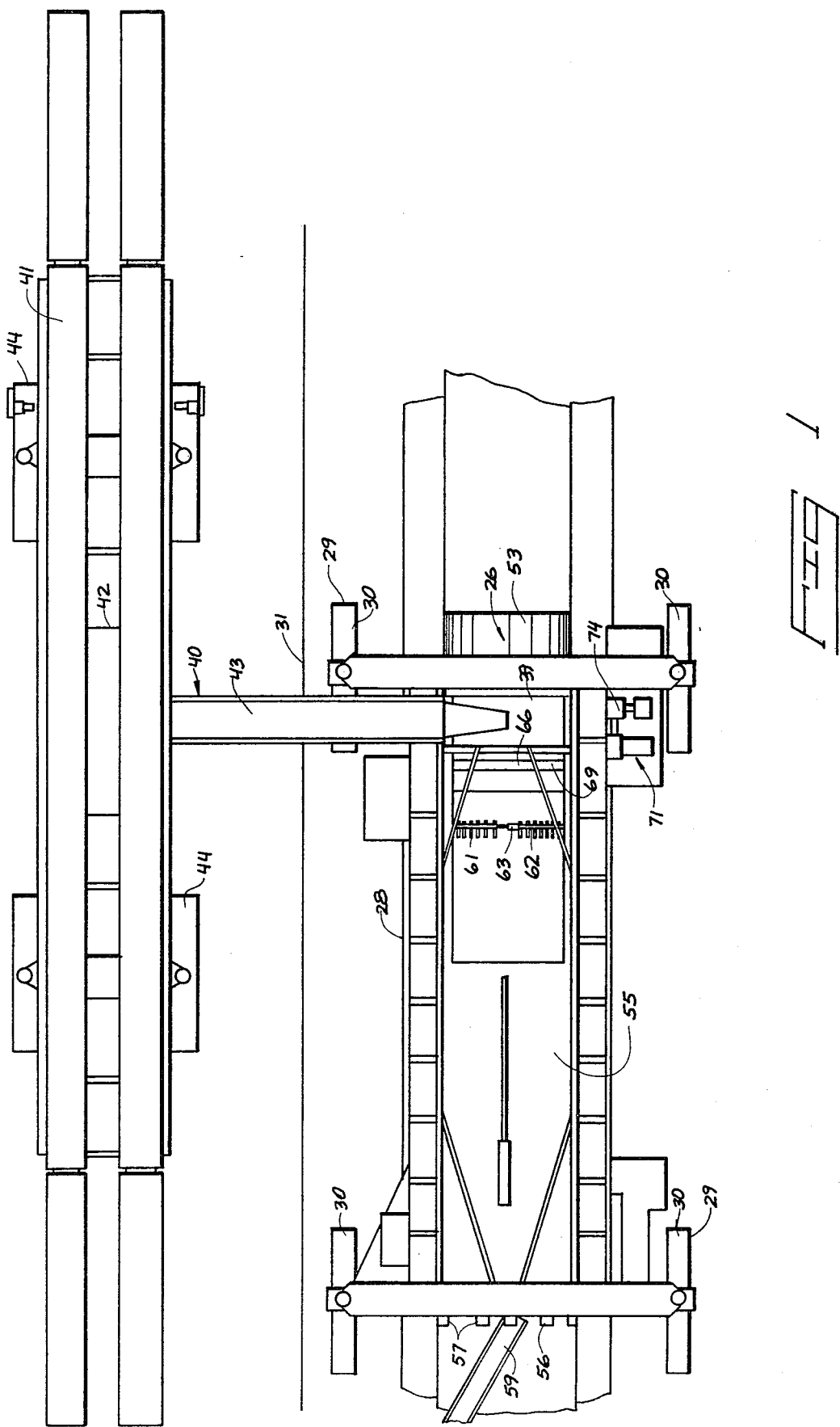

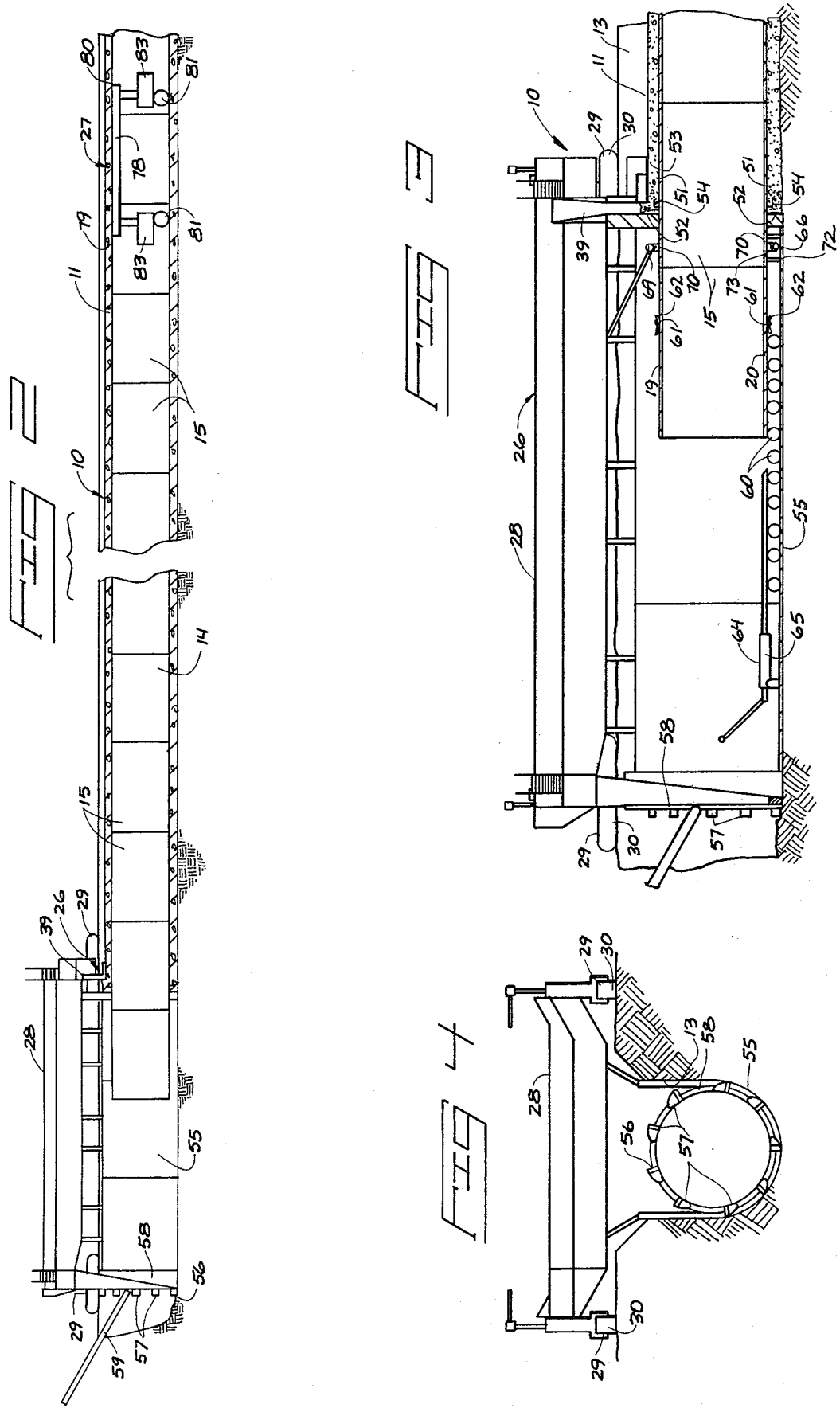

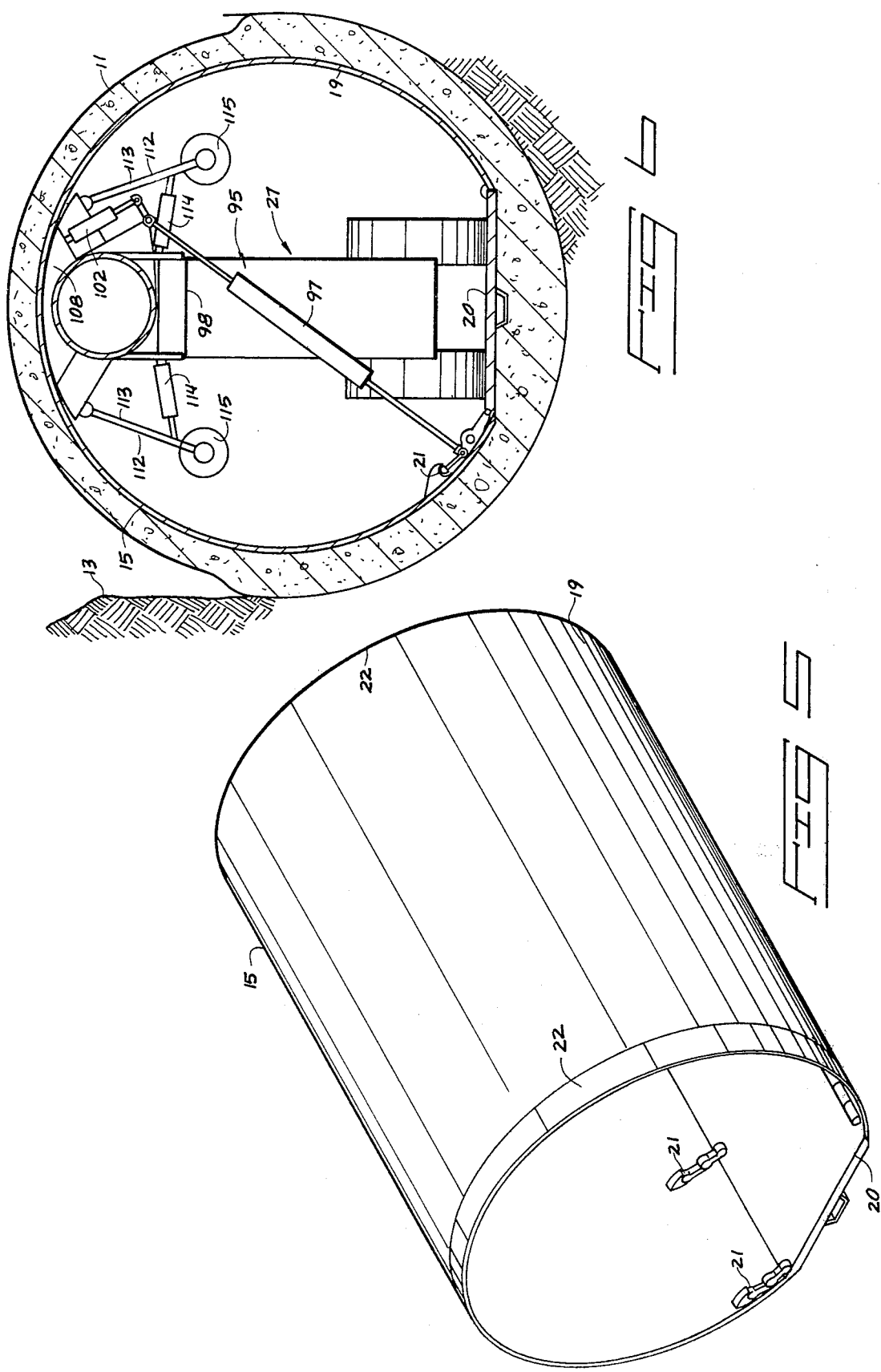

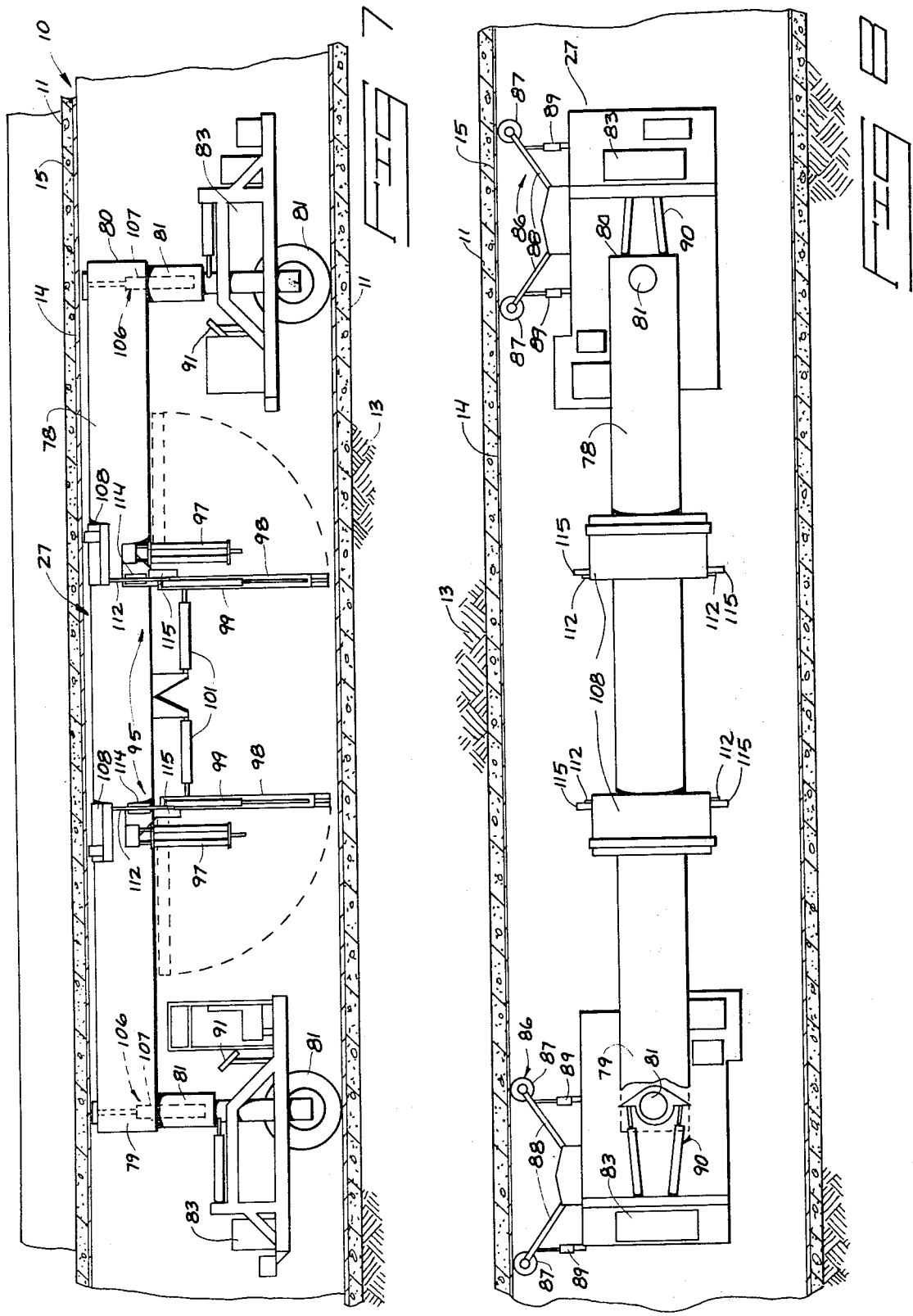

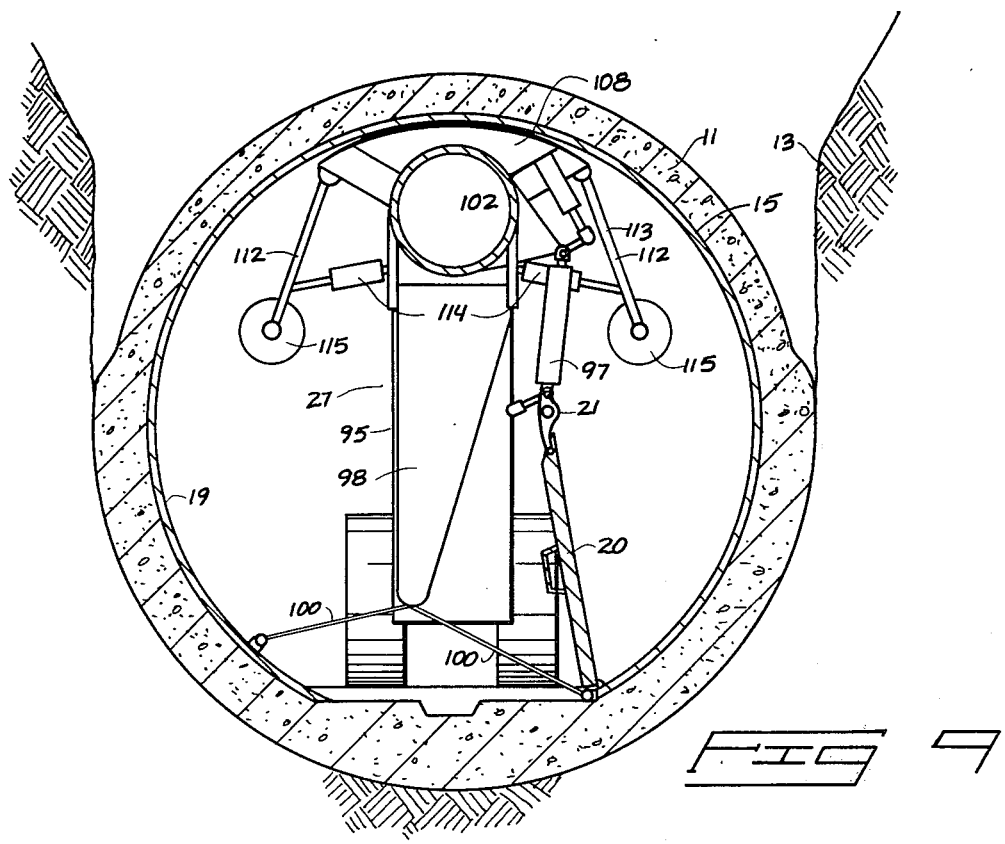
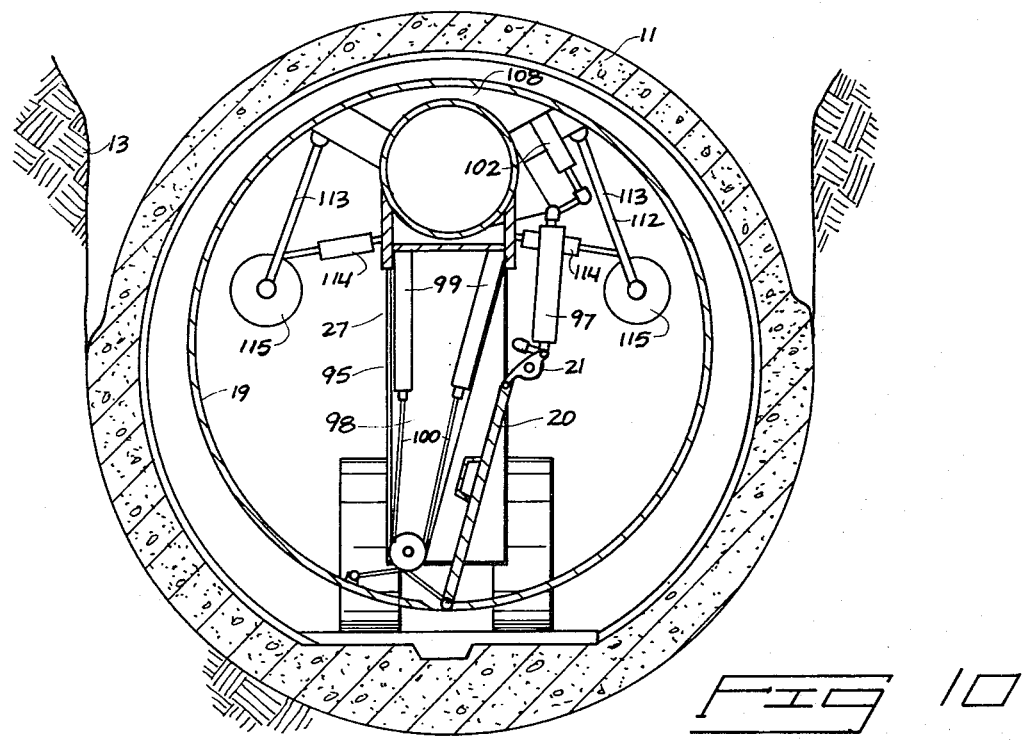

FORM HANDLING SYSTEM

BACKGROUND OF THE INVENTION

The present system is related to systems for continuously forming elongated monolithic concrete pipe or tunnel within an open excavation.

Continuous monolithic conduit formation began with U.S. Pat. No. 59,578 to Follensbee, who disclosed hinged, collapsible forms used in pouring upright shafts (well casings) in which several of the forms were interconnected coaxially. The bottom form of the interconnected line could be collapsed and withdrawn through the remaining interconnected forms to the top of the pour. There it was reconnected at the top form, completing a cycle of a "leapfrog" effect. Follensbee therefore teaches the basic utilization of several interconnected, coaxial core form sections that can be contracted and moved axially through one another continuously as concrete is being poured to form a continuous elongated monolithic structure. Follensbee described his forms as being used for upright well casing forming purposes. Other systems, following later in the art, have adapted the "leapfrog" system in forming low elongated tunnels and pipes extending along relatively horizontal excavations.

U.S. Pat. No. 515,016 to E. L. Ransome discloses collapsible forms and a truck mechanism for removing a collapsed form axially through the remaining interconnected forms. The method discussed by Ransome includes: (a) moving of the truck to an inner end of the pipe (b) raising an arm of the truck into engagement with the innermost form section, (c) disconnecting the section from the remaining sections, (d) compressing the section to a reduced cross-sectional diameter, and (e) transporting the section to the forward end of the pipe. The section can then be re-expanded on the transporter and reattached to the forward form section, completing a "leapfrog" effect. The Ransome transporter mechanism runs along tracks formed within the individual formed segments. The wheels must therefore be offset from the form removing and replacing mechanism so the transporter can be supported within the assembled line of forms as the transported form is re-expanded and attached to the forward end of the line.

U.S. Pat. No. 1,751,147 to Hackley discusses a method of lining tunnels utilizing the "leapfrog" system of moving successive forms through a plurality of other interconnected, coaxial forms. Hackley makes use of a carriage that is adjustable vertically for the purpose of engaging, stripping and re-expanding forms. The carriage is also used for moving the contracted forms longitudinally within the tunnel being formed. The carriage runs on tracks that are supported by timbers within the excavation.

U.S. Pat. No. 1,788,200 to Molin et al discloses a flexible, collapsible concrete forming tunnel forming core system. An adjustable mechanism is also disclosed that is movable on longitudinal tracks for the purpose of collapsing, expanding and longitudinally moving forms within a tunnel. The truck is movable, along tracks that have been placed on a preformed floor section of the tunnel. The remaining overhead portions of the tunnel are poured later, using partial form sections. The tunnel is therefore formed in two separate steps, first the floor, then the remainder.

U.S. Pat. No. 2,870,518 to Bossner teaches use of hydraulic cylinders and cable arrangements connected between a central structure and a collapsible form for the purpose of expanding and collapsing the hinged form sections.

U.S. Pat. No. 3,022,562 to David C. Card discloses a tunnel form and a carriage for collapsing, transporting and re-expanding forms. This device runs on tracks within the excavation and has various hydraulic arrangements for collapsing, carrying and re-expanding the collapsible form elements. Again, it is noted that the form elements disclosed are formed in several hinged segments and that the carriage runs along tracks that are supported along the bottom of the excavation.

Reissue Pat. No. 26,132 to Cerutti shows another collapsible, hinged form member with a truck arrangement adapted to collapse and re-expand the form members and to move them longitudinally within the formed pipe or tunnel. The carriage or truck here is suspended from a track system that is carried above the floor surface of the tunnel.

U.S. Pat. No. 3,123,883 to James H. Peirsol describes collapsible upper core form members separable from tunnel floor form member. The upper core form member, includes a cam mechanism for expanding the form to a desired semi-circular cross-sectional configuration. Wheels are provided on the floor form members to allow longitudinal movement of the upper arcuate core form sections.

U.S. Pat. No. 3,768,267 to Chlumecky discloses a system by which tunnels are lined with interconnected lining and support structures. These structures are placed within the tunnel in a contracted configuration and transported longitudinally through previously expanded forms to an inner end. There they are re-expanded and connected to the previously joined supports. A rail network is provided to support the form section transport carriage.

None of the above referenced patents disclose a system by which an enlarged, horizontal conduit or tunnel can be formed literally continuously along an elongated open excavation for an extended period of time, primarily because the individual form sections will eventually become crusted over with hardened concrete and will lock into place within the tunnel. The form sections must therefore be periodically removed for cleaning and reapplication of form release prior to reuse. This substantially slows the operation and requires use of additional equipment and workers above the excavation. Further difficulty is encountered with providing as separate units an excavation trimming device, an inner form section mechanism and the slipforms themselves. Perfect coaxial alignment of the individual interconnected forms is difficult to maintain with these elements operating independently of one another.

It therefore becomes desirable to obtain some form of system utilizing the advantages of the leapfrog method of forming tunnels and pipes whereby the pour may be extended continuously and simultaneously with the leapfrog operation, trimming of the excavation, and cleaning of the form sections. It is also desirable to obtain such a system in which the form transporter is supported by the interconnected, static line of forms and will move longitudinally therein on pneumatic tires, therefore avoiding the use of rails.

BRIEF DESCRIPTION OF THE DRAWINGS

FIG. 1 is a diagrammatic plan view of the slipform and adjacent apparatus of the present system;

FIG. 2 is a schemmatic view illustrating the present system;

FIG. 3 is a diagrammatic side sectional view of the slipform;

FIG. 4 is a diagrammatic front elevational view of the slipform;

FIG. 5 is a pictorial view of a single inner form section;

FIG. 6 is a diagrammatic end elevational view of an inner form section and form transporter;

FIG. 7 is an enlarged side elevational view of a form section transporter;

FIG. 8 is a plan view of the transporter shown in FIG. 7;

FIG. 9 is a view similar to FIG. 6 only showing the floor of the form section pivoted upwardly; and FIG. 10 is a view similar to FIG. 9 only showing the form section contracted and supported by the transporter.

DETAILED DESCRIPTION OF A PREFERRED EMBODIMENT

The present invention is utilized generally for the formation of elongated horizontal monolithic concrete conduit that is shown in FIGS. 2, 3 and 6-10 by the reference character 11. The present system 10 is intended for use within an elongated excavation 13 that is open along the ground surface. The particular cross-sectional configuration of the excavation is not essential to proper functioning of the present invention but is preferred to be substantially semicircular.

The present system is used to form monolithic concrete "conduit". The term "conduit" as used herein is to be taken as any tubular configuration forming a tunnel, pipe, or other relatively horizontal, hollow configuration extending over a substantial length.

The present system 10 is comprised of three basic components. First, a static line 14 of inner formed sections 15 is provided. The static line 14 is composed of a plurality of interconnected form sections 15. Each of the sections 15 can be removed and expanded or contracted to alter its cross-sectional size. The second basic component operates in conjunction with the form sections to produce the elongated monolithic conduit configuration. It is comprised of a slipform assembly 26 which operates as means to form wet concrete into the conduit configuration illustrated in longitudinal cross section in FIG. 2 and in transverse cross section in FIGS. 6, 9 and 10. The third basic component of the invention is a form transporter means 27. The transporter means 27 is utilized to engage, contract and expand the individual form sections and to move longitudinally within the static line 14 to shuttle the individual form sections lengthwise within the static line.

A single inner form section 15 is illustrated in detail by FIG. 5 and in cross section in FIGS. 6, 9 and 10. Each form section 15 includes a single piece semicircular wall 19 (FIG. 5) and a longitudinally hinged floor section 20. A latch mechanism 21 (FIGS. 5 and 6) is provided for securing and releasing the floor section 20 to opposite ends of the semicircular wall 19. Each of the form sections 15 include interfitting form section ends 22. Appropriate latch arrangements (not shown) may be provided to interconnect with one another along the length of the static line to form an elongated core form for the slipform means 26.

The form sections 15 are progressively assembled during formation of the conduit and, after a select number have been interconnected, the form transporter is operated to shift successive form sections 15 from the rearward end of the line to the forward end in a "leap-frog" effect known in the prior art.

The slipform assembly is shown in substantial detail in FIGS. 1 through 4. The slipform performs several functions beyond merely forming concrete into the monolithic conduit. The additional functions are, trimming the excavation to a specified grade, assisting in connecting successive forms at the forward end of the static line, and cleaning the successive forms. This is all accomplished while the assembly is moving along and simultaneously receiving and forming wet concrete about the interconnected inner form sections 15. The slipform assembly is mounted to a general elongated framework 28 having a rearward end adjacent the forward end of the static line 14 and a forward end facing forwardly along the excavation. Elements performing the above described functions are mounted to the general elongated framework 28.

The frame 28 is driven along the excavation by a slipform drive means 29. As shown in FIGS. 1 and 4, the slipform drive means 29 is comprised of a series of driven tracks 30. The tracks 30 are powered by conventional power trains and are controlled through a level and directional control means diagrammatically indicated at 31 in FIG. 1. The control 31 is similar to that utilized for road constructing and paving machines. An elongated guidance line is set by surveyors along a path parallel to the excavation and at a predetermined elevation. Sensors (not shown) are positioned along the framework 28 to engage the line and produce appropriate signals to steering mechanisms for automatically guiding the slipform mechanism along the excavation. They are also used for maintaining the correct elevational position of the slipform elements within the excavation. Various known steering provisions and lifting or lowering jacks (not shown) can be utilized to accomplish these functions.

Wet concrete is supplied to a hopper 39 on the slipform means via a concrete delivery means 40. The concrete delivery means may comprise a truck ramp 41 (FIG. 1). Concrete delivery trucks may be driven onto the ramp 41 to unload bulk quantities of concrete into a hopper 42 below. An elongated conveyor 43 receives concrete from the hopper 42 and delivers it into the hopper 39.

Means is provided at 44 for driving the concrete delivery means 40 along the excavation with the remainder of slipform means 26. Drive mechanisms similar to drive 29 may be used to move the delivery means 40 along the excavation.

Concrete delivered through the hopper 39 is directed about the static line of interconnected form section 15 as the slipform is moved slowly forwardly. The result is a continuous, monolithic, conduit formed of concrete, substantially "extruded" from the slipform means as it is continuously moved forwardly over the static line.

The concrete is received from the hopper 39 into a void 51 (FIG. 3). The void 51 is defined by an upright bulkhead 52, an outer arcuate form member 53, the exterior surfaces of the interconnected form sections 15 and the exposed surfaces of the excavation.

The outer form member 53 is joined to the bulkhead 52 and to the hopper 39 as shown in FIG. 1. The outer form member 53 extends rearwardly from the bulkhead 52 in a configuration substantially complementary to the cross-sectional shape of the form sections 15. The resulting configuration of the formed concrete along the open upwardly exposed surface of the conduit is shown in FIGS. 9 through 11. As the slipform is moved along, the outer form member 53 substantially "trowels" the concrete along the upper surface to produce the desired shape.

The bulkhead 52 includes an opening to loosely receive and slide over the static line of interconnected form sections. The bulkhead may include seals or bushings (not shown) to prevent forward escape of wet concrete. Spaced slightly rearwardly of the bulkhead 52 is a consolidator ring 54. The ring 54 is circular, positioned within the void 51 to transversely encircle the adjacent successive static form section 15. It is powered to oscilate or vibrate within the void 51 to cause concrete delivered through the hopper to flow completely about the interconnected form sections 15 behind bulkhead 52.

Ahead of the bulkhead 52 on slipform means 26 is an invert shield 55. The shield 55 projects forwardly from the bulkhead 52 and is utilized partially to guide the slipform within the excavation and to receive and position successive individual form sections 15. The shield is substantially semicircular in cross section (FIG. 4) to match or complement the similar cross-sectional configuration of the excavation. The exterior surfaces of the shielf ride on or substantially close to the trimmed surfaces of the excavation.

At a forward end of the invert shield 55 is a trimmer means 56. Means 56 is used to bring the excavation to a final grade configuration just prior to passage of the slipform. The trimmer means 56 may be comprised of a series of toothed buckets 57 mounted to a circular frame 58. The frame 58 carries the buckets 57 in a circular path that is set in diameter and elevation to the exact dimensions required of the excavation.

The circular frame 58 (FIGS. 3 and 4) is powered to rotate, moving the brackets in a circular path along the excavation surface. The buckets empty into a discharge conveyor 59. Conveyor 59 leads laterally from the excavation to discharge the trim material from the excavation along one side thereof.

The trimmer means 56 is held in position on the invert shield and elongated framework and will follow the same path as determined by the level and directional control means 31. The relative position of the slipform excavation and static line 14 will therefore remain coaxial.

Within the invert shield 55 is means for interconnecting or joining the successive form sections with the forward end of the static line. The invert shield 55 includes a number of rollers 60 (FIG. 3) along its inward surface that movably receive the successive form sections. The rollers 60 allow longitudinal coaxial movement of the form sections ahead of the static line.

The rollers 60 lead the successive form sections into engagement with a form compressor means 61. Compressor means 61 is comprised of an annular split ring 62 having ends innerconnected by a compressor cylinder 63 (FIG. 1). The ring is flared forwardly to receive the successive form sections at a point immediately ahead of the bulkhead. Means 61 is utilized to assure roundness of the successive form sections. It also correctly positions the successive sections coaxially with the remainder of the interconnected form sections in the static line 14.

Longitudinal movement of the individual form sections within the invert shield 55 is accomplished by an inner form stuffer 64 (FIG. 3). The "stuffer" 64 is termed such because it is used to "stuff" the successive form sections longitudinally against the static line of interconnected sections. Their interfitting form section ends 22 then fit together in coaxial sealed relation.

The form stuffer 64 is basically comprised of a movable cylinder 65 that is longitudinally oriented and connected to the shield 55. The remaining end of the cylinder 65 can be selectively connected to the successive form sections and operated to move them longitudinally toward the compressor means 61 and the forward end of the static line.

Just before the slipform moves over a connected form section at the forward end of static line 14, the form is cleaned thoroughly and coated with mold release. This is accomplished by a form cleaning means generally illustrated at 66. The form cleaning means is situated along the axis of the static line between the compressor means 61 and bulkhead 52.

Cleaning means 66 includes an annular spray ring 69 of a diameter slightly greater than the cross-sectional size of the form sections. It will completely encircle the form sections and move longitudinally with the slipform relative to any form sections connected to the static line.

A number of inwardly facing nozzles 70 (FIG. 3) lead from the spray ring 69 to direct cleaning fluid and mold release material against the surface of the adjacent form section. The spray bar may be oscillated about the axis of the form and static line to assist the cleaning function.

Cleaning and mold release fluids are delivered to the spray ring 69 through a pump means 71 (FIG. 1). The pump means 71 receives spray fluid from a recycling and reconditioning means 72. The recycling and reconditioning means, in turn, receives soiled fluid from a sump 73 (FIG. 3) below the spray ring 69. The recycling and reconditioning means 72 may inclue an appropriate filter 74 (FIG. 1) to thoroughly clean the fluid prior to its reapplication against the adjacent exterior form surface.

The form transporter means 27 moves independent of the slipform means. It is operable to remove successive form sections from the rearward end of the static line and move them forwardly through the line to be deposited within the invert shield 55. The transporter 27 is steered either automatically or through manual controls by one or preferably two operators. The operators ride along with the form transporter within the open bore formed by the successive interconnected sections of the static line.

The form transporter 27 basically includes an elongated frame 78 (FIGS. 7 and 8), preferably comprised of a long, tubular beam. The frame 78 extends from a front end 79 to a back end 80. The frame is supported at the opposite ends 79, 80 by a number of pneumatic tires 81 that may engage either the section floors or the inner surfaces of the shield 55.

The tires 81 are mounted to the frame through upright steering columns 82. Selective steering of the transporter is accomplished about upright axes defined by the steering columns 82. A drive means 83 is provided for moving the frame longitudinally forward and backward.

A steering means 86 (FIG.8) is provided that can automatically position the transporter centrally within the static line or within the tunnel. The steering means includes laterally projecting arms 88 having freely rotated wheels 87 mounted at outward ends. The wheels and arms are biased outwardly to engage adjacent surfaces of the conduit or static line.

Sensors 89 are provided for each of the arms 88 to detect any movement and provide control input to a steering drive means 90. The steering drive means 90 may simply be comprised of a number of cylinders operating on the upright steering columns 82 to shift the columns and the tires selectively about the upright steering axes.

The automatic steering provision can be bypassed or augmented through an operator's console 91. Two consoles 91 are provided, one at each end of the frame. Each console 91 includes an automatic steering override control as well as other appropriate controls for the remaining mechanisms associated with the transporter.

Means is provided at 95 between ends of the elongated frame 78 for disengaging the inner form sections. Means 95 includes a number of floor fold cylinders 97 and form handling arms 98. The floor fold cylinders 97 are utilized to pull the hinged floor sections 20 upwardly to the FIG. 9 position while the form handling arms 98 operate to move the semicircular form wall 19 from its fully expanded condition (FIG. 9) to a retracted condition (FIG. 10).

The floor fold cylinders 97 are spaced along the elongated transporter frame 78. The spacing is substantially equal to the spacing of latch mechanisms 21 that releasably join the floor sections 20 and semicircular wall 19. The cylinders 97 extend, brining free ends toward engagement with the latch mechanisms 21. The latch mechanisms may then be automatically or manually attached to the cylinder ends. Subsequent retraction of the cylinders 97 causes upward pivotal movement of the floor section to the open, FIG. 9 position. This allows circumferential contraction of the individual form to disengage it from the rearward end of the static line. The contracted or "shrunk" section is then capable of longitudinal travel through the remaining interconnected forms of the static line.

The form handling arms 98 are pivoted on the elongated frame 78. They move from closed, horizontal positions (dashed lines in FIG. 7) to upright, downwardly projecting operative positions, (FIGS. 7, 9 and 10). Each handling arm 98 includes a pair of form handling cylinders 99 (FIG. 10). Connector cables 100 extend from the cylinders with outward ends adapted for connection to appropriate flanges on the semicircular wall 19. Retraction of the cylinders causes inward movement of the cables to pull ends of the semicircular wall 19 together. This movement reduces the circumference of the form section and effectively reduces its outside diameter.

The form handling arms 98 must be free to pivot between the horizontal and vertical position in order to allow folding motion of the floor sections 20 (FIG. 8). Arm folding cylinders 101 (FIG. 7) are provided on the elongated frame 78. Cylinders 101 are operable to swing the arms 98 between the upright operative and horizontal inoperative positions. Other small cylinders 102 may be provided to control pivotal movement of the floor folding cylinders 97.

Means is provided at 106 (dashed lines, FIG. 7) for supporting the disengaged forms for vertical movement on the frame 78. Such means 106 may be comprised of a lift cylinder 107 on each of the steering columns and form receiving saddles 108 on the frame 78. The lift cylinders are located directly within the steering columns to cause movement of the saddles 108 upwardly to engage the top surface of a form as illustrated in FIG. 9. The cylinders can also move the saddles to lowered positions to lower the form section as it is being contracted, allowing free longitudinal movement of the form section through the static line.

Means is also provided on the form transporter as shown at 112 (FIGS. 6, 9 and 10) for assisting expansion of the individual form sections. This is typically done after the section has been transported to the forward end of line 14. Means 112 includes form expansion arms 113 that extend transversely outward from the frame 78. They are pivoted about longitudinal axes by expansion cylinders 114. Small wheels 115 at the outward arm ends serve to engage and roll against inwardly facing surfaces of the form sections as the arms are extended outwardly.

Extension of the arms 113 may be used when an individual form section for some reason will not return of its own accord to its original expanded configuration, upon latching of the floor section. Of course, the form compressor means 61 also assists in the function of reshaping the successive form sections to a desired configuration.

OPERATION

Prior to operation of the present system, the excavation is prepared and surfaced to a prescribed grade. Once this is accomplished, the slipform is lowered into the excavation. The above excavation equipment is put into position for movement longitudinally along the excavation. The course for the slipform as it is moved along is then set forth by, preferably, a surveying team, who drive stakes and set the guideline for the level and directional control means 31. Once this is accomplished, operation may begin.

The outer form member 53, as shown in the drawings, does not extend the full length of one of the inner form sections 15. Therefore, planking or some other appropriate closure is provided at the beginning to enclose the void 51 behind the outer form member 53 at the starting point.

A rearward plug or bulkhead (not shown) may also be situated at the rearward end of the first form section, excavation walls, and the planking to complete enclosure of the void. The planking and plug or bulkhead can be later removed once the concrete delivered to the area of the planking and plug has sufficiently solidified.

Operation is initiated as a truck is driven onto the truck ramp 41 to empty its load of concrete into the hopper 42 below. The concrete delivery means 40 then functions to deliver wet concrete from the hopper 42 along conveyor 43 to the hopper 39 of the slipform means.

Forward movement of the slipform is not initiated until sufficient concrete has been received to fill the entire void about the first section. Concrete may be delivered in relatively continuous supply along the truck ramp into the hopper 42. The hoppers 42 and 39 may be large enough to store a "surge" supply of concrete in addition to the amount required for operation by the slipform.

After the void fills, forward motion of the slipform may be initiated by operation of the drive means 28. The rate of forward movement is timed in relation to the delivery and placement of concrete about the inner form member so that a continuous, monolithic, conduit is formed without voids. The consolidator ring operates conntinuously to evenly distribute and consolidate the wet concrete about the inner form members.

As the slipform progresses forwardly, successive form sections are added to the first form section by lowering them into the invert shield. The inner form stuffer means 64 is attached to the successive form sections. Means 64 is successively operated to move the sections rearwardly into engagement with the form compressor means 61 to engage the forward end of the previously placed section. The interfitting form section ends 22 will be joined and appropriate latches at the form ends may be actuated to interlock the successive forms.

Individual form sections are added in this manner, one at a time. Eventually a sufficient number of form sections will have been lowered into the excavation to produce a static line of considerable length. The length of form sections is determined by the forward rate of the slipform and, more particularly, by the rate of solidification of the concrete delivered.

The selected number of forms used may vary but from experimentation, it has been found that a conduit having an inside diameter of approximately fourteen feet can be formed using 35 interconnected inner form sections (forming the static line) with each section including a length of approximately 20 feet. Thus, by the time the slipform has progressed approximately 700 feet, forming 700 feet of conduit, the concrete situated at the rearward end of the conduit will have sufficiently solidified to allow disengagement and contraction of the first placed form section.

Removal of the first placed form section at the rearward end of the conduit is accomplished with the transporter 27. The transporter is moved to the rearward conduit end and positioned so that the tires at the opposite ends of the transporter frame are situated outward of the opposite form ends. The lift cylinders 107 are then actuated to bring the saddles 108 upwardly to engage the form section near the top of its inwardly facing surface.

The floor fold cylinders 97 are then connected to the latch mechanisms 21 (FIG. 6). Cylinders 97 are then retracted (FIG. 9) to disengage the floor from the adjacent concrete surface, folding the floor upwardly from the FIG. 6 position to the FIG. 9 position.

Once the floor section has been pivoted upwardly, the form handling arms can be lowered to their operative, FIGS. 9 and 10 positions. The cylinders 99 are extended to allow the connector cables 100 to be fastened to the semicircular wall 19 of the form section.

Contraction of the cylinders 99 then causes similar contraction of the form section to a cross-sectional configuration smaller than the inside conduit diameter. The lift cylinders 107 can then be retracted to slightly lower the contracted form into the FIG. 10 transport position. The disconnected form is then free to be moved by the transport from the rearward end of the static line to the forward end.

Steering of the moving transport is maintained automatically through the steering means 86. Means 86 operates to keep the form and transport framework accurately centered within the static line and allows relatively quick movement of the constricted form section through the static line to the forward end.

The transport is operated to bring the form section forwardly of the static line and to deposit it within the invert shield. Re-expansion is done by extending the form handling cylinders 99 and allowing the normally resilient form section to expand to substantially its originally expanded state. The connector cables 100 are then detached and the cylinders 99 are retracted. The folding cylinders 101 are then actuated to pivot the form handling arms 98 to the horizontal, inoperative positions.

When the form handling arms 98 are clear, the floor fold cylinders 97 may be swung about by their control cylinders 102 and extended to pivot the floor downwardly to the closed position. The form will usually retain its original cross-sectional configuration after the floor is latched.

The transporter is then moved rearwardly again through the static line to its rearward end for the purpose of disconnecting and bringing the next successive form section forwardly. Meanwhile, the form section within the invert shield is attached to the form stuffer 64 and moved longitudinally to engage the form compressor means 61. The compressor ring will function to mold the form (if out of round) into the desired configuration prior to connection at the forward end of the static line.

The form section then moves on rearwardly throught the compressor means into engagement with the form section at the forward end of the static line. There it is interconnected with the leading section through the interfitting ends 22. Other appropriate latching mechanisms may also be connected at this point. The slipform will move forwardly over the now static form section.

The outer surfaces of the successive forms are progressively cleaned by the form cleaning means 66. The entire circumference of each form is sprayed with cleaning fluid and mold release. The fluid may be continuously delivered during operation of the slipform.

The trimmer means 56 is continuously operated to bring the excavation to a precise, finished surface grade. The selected grade is maintained by the rearwardly trailing invert shield. Wall thickness and coaxial alignment of the inner form sections with the excavation is thereby assured.

The form sections are precisely positioned and molded into a continuous desired configuration as well as being cleaned. This is all done without need of removing the form sections from the excavation.

Upon completion of a desired length of conduit, delivery of concrete is halted. The forward progress of the slipform is also halted. The static line of interconnected form sections are progressively removed through the invert shield section by the transporter. This is done at a rate commensurate with the curing rate of the concrete conduit. When the last form section has been removed, the entire slipform can be elevated from the excavation, leaving a completed monolithic conduit of substantially any desired length.

The above description and drawings are given by way of example to set forth a preferred form of the present invention. The following claims more closely define the scope of the invention.

What is claimed is:

1. A system for forming an elongated monolithic concrete conduit within an excavation with releasably interconnected collapsible hollow inner form sections extending in a static line from a rearward end to a forward end comprising:

slipform means for receiving and directing wet concrete about the interconnected inner form sections;

drive means for moving the slipform means forwardly within the excavation as concrete is delivered to the slipform means;

form section transporter means for successively:
(a) collapsing a form section at the rearward end of the interconnected form members; (b) moving the collapsed form section forwardly through the remaining interconnected sections to the forward end of the static line; (c) re-expanding the collapsed form section for connection at the forward end of the static line; and (d) returning to the rearward end of the static line to collapse the next successive form section;

steering means for guiding the transporter means along within the static line of interconnected inner form sections; and form cleaning means ahead of the slipform means for washing the successive inner form sections forward of the slipform means.

2. The system as defined by claim 1 further comprising:
a trimmer means on the slipform means for finishing the excavation ahead of the forward end of the static line.

3. The system as defined by claim 1 wherein the form section transporter means comprises:
a wheel supported frame;
drive means on the frame for moving the frame along within the form sections of the static line; and
form section expansion and contraction means on the wheel supported frame for contracting successive form sections to a cross-sectional dimension less than the internal cross-sectional dimension of the static line of interconnected form sections to thereby allow transport of the contracted sections within the static line, and for re-expanding the successive form sections at the forward end of the static line.

4. The system as defined by claim 1 wherein the form cleaning means is comprised of:
an annular spray bar on the slipform means substantially centered on the static line of form sections receiving and encircling successive form sections as the slipform means is moved along;
spray nozzles spaced about the spray bar and directed inwardly toward the center of the annular spray bar to direct a fluid spray against the peripheral outer surfaces of the successive form sections as the slipform means is moved along; and
fluid pump means for pumping a fluid under pressure to the spray bar.

5. The system as defined by claim 4 further comprising:
recirculating means on the slipform means below the spray bar for receiving, reconditioning and recycling fluid from the spray bar.

6. The system as defined by claim 1 further comprising form interconnecting means on the slipform for receiving successive form sections brought to the front end of the static line and for interconnecting the successive sections to the front end of the static line.

7. The system as defined by claim 6 wherein the form interconnecting means is comprised of:
compressor ring means for receiving successive form sections brought forwardly by the transporter means and for pressing the successive form sections into a desired cross-sectional configuration; and
form stuffer means for engaging and moving the successive form sections at the compressor ring longitudinally to connect with the front form section of the static line.

8. The system as defined by claim 1 wherein the form transporter means is movably supported within the interconnected form sections of the static line by pneumatic tires and wherein the tires are rotatably mounted to upright steering columns at forward and rearward ends of the transporter means.

9. The system as defined by claim 8 wherein the steering means is comprised of pairs of wheels mounted to pivot arms that extend laterally from the transporter means;
sensor means operably connected to the pivot arms for sensing pivotal movement of the arms due to lateral movement of the transporter means relative to the static line;
steering drive means for turning the pneumatic tires about the upright steering columns in response to the sensor means and thereby maintain the transporter means centered within the interconnected form sections of the static line.

10. The system as defined by claim 9 wherein the transporter means includes an elongated frame with the tires and steering columns located at opposite ends thereof and wherein an operator's console is located at each end of the frame, with each operator's console including steering controls for overriding the steering means.

11. The system as defined by claim 1 wherein the slipform means is supported from the ground surface above the excavation and is powered to move along within the excavation by the drive means from the ground surface.

12. The system as defined by claim 11 further comprising elevational and horizontal directional control means operatively connected with the drive means for guiding the slipform accurately along the excavation.

13. The system as defined by claim 1 further comprising concrete delivery means movably supported along the ground surface adjacent the slipform, comprising:
a truck support ramp;
a concrete receiving hopper adjacent the ramp for receiving concrete from a truck positioned on the ramp;
conveyor means for delivering concrete from the receiving hopper to the slipform; and
means for moving the ramp, hopper and conveyor means along the excavation in unison with the slipform.

14. In a monolithic concrete conduit forming system whereby a monolithic concrete conduit is formed by a forwardly moving slipform within an excavation and by collapsible tubular inner form sections releasably interconnected in a static line extending from a forward end adjacent the slipform to a rearward end spaced along the axis of the conduit from the forward end, an inner form section handling transporter, comprising:
a pneumatic tire supported frame;
drive means for moving the frame along inside the interconnected inner form sections;
means on the frame for disengaging an inner form section at the rearward end of the static line of form sections and for contracting the disengaged inner form section to a cross-sectional configuration capable of being moved longitudinally within the remaining interconnected inner form sections and thereby allow transport of the collapsed inner form sections to the forward conduit end;

means on the frame for supporting the disengaged form section member for vertical movement thereon;

means for assisting expansion of the disengaged inner form section at the forward tunnel end to an expanded cross-sectional configuration; and steering means for operatively engaging inside surfaces of the interconnected inner form sections within said static line and guiding the frame as it is moved along therein.

15. The combination defined by claim 14, wherein the frame is elongated longitudinally with respect to the static line and wherein the steering means includes upright steering columns at opposite ends of the elongated frame each mounting pneumatic tires for rotation thereon.

16. The combination defined by claim 14 wherein the frame is elongated and includes an operator's console at opposite ends thereof with each console including operator steering controls.

17. In a monolithic concrete conduit forming system whereby a monolithic concrete conduit is progressively formed over a static line of interconnected tubular inner form sections arranged within an upwardly open excavation, a slipform movable over the static line for receiving wet concrete and for forming the wet concrete about the static line of inner form sections, comprising:

an elongated slipform framework adapted to extend into the excavation;

drive means for moving the framework longitudinally along the excavation;

a concrete receiving hopper on the framework;

a bulkhead on the framework forwardly adjacent the hopper and slidably encircling an inner form section at a forward end of the static line of interconnected tubular inner form sections;

an outer form member mounted to the bulkhead and extending rearwardly therefrom in spaced relation to the adjacent inner form section to form a semiannular space between the inner form sections and outer form member that is in open communication with the hopper, for receiving and molding wet concrete about the adjacent static inner form sections;

an invert shield on the frame projecting forward of the bulkhead and complementary in cross section to the excavation for sliding movement along the excavation surface and for movably receiving and positioning successive inner form sections in axial alignment with the static line;

means on the framework for joining successive inner form sections to the forward end of the static line forward of the bulkhead; and form cleaning means forward of the bulkhead for cleaning successive inner form sections as the slipform is moved along.

18. The combination as defined by claim 17 further comprising an excavation trimmer means forward of the invert shield for smoothing the surface of the excavation to a prescribed contour complementary to the cross-sectional configuration of the invert shield.

19. The combination as defined by claim 17 further comprising elevational and horizontal directional control means operatively connected with the drive means for guiding the slipform accurately along the excavation.

20. The combination as defined by claim 17 further comprising concrete delivery means movably supported along the ground surface adjacent the slipform, comprising:

a truck support ramp;

a concrete receiving hopper adjacent the ramp for receiving concrete from a truck positioned on the ramp;

conveyor means for delivering concrete from the receiving hopper to the hopper on the slipform framework; and means for moving the ramp, hopper and conveyor means along the excavation in unison with the slipform.

21. The slipform as defined by claim 17 wherein the cleaning means is comprised of:

an annular spray bar on the slipform framework centered on the static line for loosely receiving and encircling successive static form sections as the slipform is moved along; and fluid pump means for pumping a fluid under pressure through the spray bar.

22. The slipform as defined by claim 21 further comprising recirculating means on the slipform framework for receiving, reconditioning, and recycling fluid from the spray bar to the pump means.

23. The slipform as defined by claim 17 wherein the means for joining successive inner form sections to the forward end of the static line includes:

inner form section compression means for receiving successive inner form sections ahead of the static line to reform the cross-sectional configurations thereof to match the forward end of the static line.

24. The slipform as defined by claim 23 wherein the means for joining successive inner form sections to the forward end of the static line further includes form stuffer means for moving the successive forms rearwardly from the compression means into contact with the forward end of the static line.

* * * * *